(12) United States Patent
Herrmann et al.

(10) Patent No.: US 11,624,638 B2
(45) Date of Patent: Apr. 11, 2023

(54) FLOW MEASURING DEVICE FOR DETECTING A VOLUME QUANTITY RELATING TO A FLUID VOLUME FLOWED THROUGH A MEASURING VOLUME SINCE A START OF A MEASUREMENT

(71) Applicant: DIEHL METERING GMBH, Ansbach (DE)

(72) Inventors: Florian Herrmann, Dinkelsbuehl (DE); Alexander Hofmann, Sachsen (DE); Marcus Wetzel, Heilsbronn (DE); Frederik Neder, Wilhermsdorf (DE)

(73) Assignee: Diehl Metering GmbH, Ansbach (DE)

( * ) Notice: Subject to any disclaimer, the term of this patent is extended or adjusted under 35 U.S.C. 154(b) by 298 days.

(21) Appl. No.: 17/026,940

(22) Filed: Sep. 21, 2020

(65) Prior Publication Data

US 2021/0270646 A1    Sep. 2, 2021

(30) Foreign Application Priority Data

Feb. 28, 2020 (DE) .............................. 202020000804
Aug. 13, 2020 (DE) ............................. 202020003475

(51) Int. Cl.
*G01F 1/66* (2022.01)
*G01F 1/667* (2022.01)

(52) U.S. Cl.
CPC .............. *G01F 1/662* (2013.01); *G01F 1/667* (2013.01)

(58) Field of Classification Search
None
See application file for complete search history.

(56) References Cited

U.S. PATENT DOCUMENTS

| 7,910,064 B2 * | 3/2011 | Hamilton | ......... G01N 33/54313 435/7.1 |
| 9,066,674 B2 * | 6/2015 | Guracar | ................... A61B 8/06 |
| 2004/0203420 A1 * | 10/2004 | Rick | ..................... G01S 5/0215 455/67.11 |
| 2019/0011303 A1 * | 1/2019 | Hashimoto | ............. G01F 1/667 |
| 2021/0007667 A1 * | 1/2021 | Thaveeprungsriporn | .................... A61B 5/4884 |

\* cited by examiner

*Primary Examiner* — Harshad R Patel
(74) *Attorney, Agent, or Firm* — Laurence A. Greenberg; Werner H. Stemer; Ralph E. Locher

(57) ABSTRACT

A flow measuring device detecting a fluid volume quantity since a start of a measurement includes a processing device determining a current flow rate parameter at measurement times using measurement data of a sensor, to increase a volume quantity based on a current flow rate parameter when operating in a first operating mode, and to keep the volume quantity constant when operating in a second mode. The processing device stores the current flow rate parameter for each measurement time in a data memory, resulting after several measuring times in storing previous flow rate parameters determined at these measuring times. Upon satisfying a switchover condition, depending on the current flow rate parameter, during operation in the second mode, the processing unit switches over to the first mode, and the volume quantity increases as a function of the current flow rate parameter and a predefined number of previous flow rate parameters.

9 Claims, 2 Drawing Sheets

FLOW MEASURING DEVICE FOR DETECTING A VOLUME QUANTITY RELATING TO A FLUID VOLUME FLOWED THROUGH A MEASURING VOLUME SINCE A START OF A MEASUREMENT

CROSS-REFERENCE TO RELATED APPLICATION

This application claims the priority, under 35 U.S.C. § 119, of German Patent Applications DE 20 2020 000 804, filed Feb. 28, 2020 and DE 20 2020 003 475, filed Aug. 13, 2020; the prior applications are herewith incorporated by reference in its entirety.

BACKGROUND OF THE INVENTION

Field of the Invention

The invention relates to a flow measuring device for detecting a volume quantity relating to a fluid volume that has flowed through a measuring volume since the start of the measurement, wherein a processing device of the flow measuring device is configured to determine a current flow rate parameter relating to the current volume flow rate at successive measurement times using measurement data of at least one sensor of the flow measuring device in each case, when the processing device is operated in a first operating mode to increase the volume quantity as a function of the current flow rate parameter and when the processing device is operated in a second operating mode, to keep the volume quantity constant.

Flow measuring devices can be implemented in a variety of ways. Ultrasound-based flow measuring devices, which typically use two ultrasonic transducers attached to the measurement volume, are becoming increasingly widespread. A flow velocity can be determined by comparing the times of flight of an ultrasonic wave between the ultrasonic transducers for both measuring directions and thus, given a known geometry of the measuring volume, a current volume flow rate can also be determined. The total volume flowing through the measurement volume since the start of the measurement can be determined by integrating the volume flow rate over time or by summing the time-discrete measurements. In addition, there are a number of different flow measurement devices in existence, such as impeller meters, flow measurement devices based on a distortion of a temperature distribution of a heating element due to the flow rate, and similar devices.

In many types of flow measuring devices, for example in the above-mentioned ultrasonic meters, at very low flow rates a noise component of the measurement data can cause higher average volume flow rates over time to be determined than are actually present. Even very small offsets can lead to large measurement errors in applications where any flow rate at all occurs for only a fraction of the measurement time. Since an excessive detected fluid volume typically leads to acceptance problems, it is known to discard very low measured volume flow rates or associated flow rate parameters. However, relatively large errors can occur during a start-up phase of the meter, or at generally relatively low flow rates.

In order to counteract that occurrence, an approach is known that defines three phases for the behavior of the flow measuring device. In an extended zero range, i.e. at very low flow rates, all measured values are discarded and the measured fluid volume is not increased. In a range of relatively low flow rates above a zero-range threshold but below a start-up threshold, the flow rate parameters affecting the volume flow rate are already determined and, in particular, integrated to determine a fluid volume that flows through the flow measuring device during that start-up phase. If the start-up threshold is exceeded within a certain time interval after the zero-range threshold has been exceeded and/or within a certain number of measurements, that value is added to the total fluid volume, since it is assumed that the value corresponds to a continuous increase within the start-up range. However, if the determined volume flow rate falls back into the extended zero range and/or does not reach the flow range at the right time, the previously measured data are rejected, since it is assumed that they do not correspond to the meter reaching the flow range.

The described method leads to good results in many applications, namely in those applications where a volume flow rate increases relatively quickly from the extended zero range into the flow range. However, in some applications, for example when slowly opening valves are used, when temporary changes in the flow direction occur and/or when flow rates occur relatively frequently in the range of the start-up threshold, relatively large measurement errors can result.

BRIEF SUMMARY OF THE INVENTION

It is accordingly an object of the invention to provide an improved flow measuring device for detecting a volume quantity relating to a fluid volume having flowed through a measuring volume since a start of a measurement, which overcomes the hereinafore-mentioned disadvantages of the heretofore-known devices of this general type and which can be used to achieve an improved measuring accuracy, in particular in the above-mentioned operating situations.

With the foregoing and other objects in view there is provided, in accordance with the invention, a flow measuring device of the type mentioned above, wherein the processing device includes a data memory, the processing device is configured, at least in the second operating mode, preferably in both the first and second operating modes, to store the respective current flow rate parameter for each measuring time at least temporarily in the data memory, as a result of which, after a plurality of measuring times a plurality of previous flow rate parameters determined at these measuring times are stored in the data memory, the processing unit is configured in such a way that if a switchover condition is satisfied during operation in the second operating mode, the satisfaction of which depends on the current flow rate parameter, the processing unit switches over to the first operating mode, and the volume quantity in this case is increased as a function of both the current flow rate parameter and a predefined number of the previous flow rate parameters.

The invention is based on the concept that, when switching from the second operating mode to the first operating mode, a number, in particular fixedly specified, of flow rate parameters, in particular determined immediately beforehand, must be taken into account. In this case, the first operating mode can correspond substantially to the flow rate range discussed above, i.e. it can be an operating mode that is used at relatively large volume flow rates. The behavior in the second operating mode can be similar to the start-up range detailed above, in the sense that also in the second operating mode of the flow meter according to the invention, flow rate parameters are determined and stored at least temporarily in a data memory. However, while in the procedure explained above these data are completely discarded after a certain dwell time in the start-up range or on entering an extended zero range, in the flow measuring device according to the invention a number, in particular fixed, of previously determined flow rate parameters can be constantly taken into account when the processing device is switched over from the second to the first operating mode.

In particular, regardless of the dwell time of the processing device in the second operating mode, a predefined number of flow rate parameters is therefore taken into account in order to increase the volume quantity on changing over to the first operating mode. As a result, on switching over to the second operating mode the previous flow rate can always be taken into account, thus achieving a particularly robust start-up behavior of the flow measuring device. In addition, in contrast to the procedure described above, no extended zero range is used, within which measurements are not taken into account at all. In particular, this avoids discarding measurement data or the buffered flow rate parameters during a transition between a positive and negative flow rate. Therefore, a considerably improved accuracy is achieved in the flow meter according to the invention, in particular in the case of slow changes in the flow rate parameter or during changes in the flow direction.

Therefore, in the flow measuring device according to the invention, in particular a flow rate quantity determined once for a specified number of subsequent measuring times is thus used as one of the preceding flow rate parameters. In principle, the number of previous flow rate parameters used may be one, but a plurality of previous flow rate parameters are preferably taken into account, in particular up to ten, up to twenty, up to fifty or more flow rate parameters. The data memory can operate as a FIFO buffer or ring buffer with regard to the storage of the flow rate parameters. In particular, read accesses can be made randomly or sequentially, in order to enable a summation or averaging of the preceding flow rate parameters, for example.

The flow rate parameter can directly describe a volume flow rate through the measuring volume, i.e. be proportional to it, for example. However, the flow rate parameter may be a quantity on which such a volume flow rate depends, i.e., a time of flight between ultrasonic transducers in an ultrasonic measurement, for example, or a time-of-flight difference.

In the simplest case, the volume quantity is increased by the flow rate parameter in the first operating mode. The exception in this case is the transition from the second into the first operating mode, since in this case the predefined number of previous flow rate parameters is also taken into account, as explained above. For example, in this case, the increase in the volume quantity may depend on the mean value of the current flow rate parameter and the predefined number of previous flow rate parameters. However, it is also possible that the current flow rate parameter is scaled to increase the volume quantity in the first operating mode, or that the increase in the volume quantity is defined by a functional relationship between the added quantity and the current flow rate parameter.

The processing device can be configured in such a way that the switchover condition is satisfied or can only be satisfied on condition that the current flow rate parameter and/or a mean value of the current flow rate parameter and the predefined number of the previous flow rate parameters and/or a volume flow rate, which is determined from the current flow rate parameter or the mean value, exceeds a respective limit value. In other words, the processing device should be operated in particular in the first operating mode when the current flow rate parameter or the mean value indicates that there is a sufficiently high flow rate to operate the flow measuring device in a flow range.

It is particularly advantageous if the switchover condition evaluates the mean value of the current flow rate parameter and the specified number of previous flow rate parameters, or a volume flow determined from this mean value, i.e. compares it with a limit value, for example, as explained above. This means that individual high current flow rate parameters, which may be caused by an error in the measurement, for example, typically do not cause a changeover to the first operating mode, but that only significant measurement effects trigger a changeover into the first operating mode.

The processing device can be configured to specify the limit value as a function of measurement data of the at least one sensor and/or of at least one additional sensor of the measuring device, recorded at the current measuring time and/or at previous measuring times. In particular, the limit value can be adjusted over relatively long periods of time, for example to allow for sensor aging or contamination of the measuring volume. This can be implemented in the case of ultrasonic meters, for example, by evaluating amplitudes of the measuring signals provided by ultrasonic transducers. A decrease in these amplitudes can indicate contamination, for example, which can lead to a higher level of noise affecting the flow rate parameters. This may require an increase in the limit value, for example. Another example of the adjustment of the limit value is a temperature-dependent adjustment, wherein the temperature can be measured through another sensor of the flow measuring device. Alternatively, sensors used to determine the flow rate parameter can also be used to determine a temperature. For example, a temperature can influence a propagation velocity of ultrasonic waves in the fluid, so that a sum of the transit times of ultrasonic waves between ultrasonic transducers in both directions correlates with the temperature.

The processing device can be configured in such a way that the increase in the volume quantity when the switchover condition is satisfied is proportional to the mean value of the current flow rate parameter and the predefined number of previous flow rate parameters, or to a volume flow rate value determined from this mean value. In other words, a sliding average value is formed for the flow rate parameter. For example, the proportionality factor can be selected to be the number of previous flow rate parameters taken into account, increased by one. The increase then corresponds to the sum of the previously considered flow rate parameters and the current flow rate parameter. Thus, a flow rate for a specified number of previous measuring times can also be taken into account, even if the flow measuring device was operated in the second operating mode during these measuring times and the determined flow rate parameter values have therefore not firstly been used to increase the volume quantity. However, since such an addition is only made when the switchover condition is satisfied and a switchover from the second to the first operating mode takes place, these measuring times are only taken into account within the second operating mode when a change to the first operating mode occurs shortly after the measurement times, i.e. when the flow rate is expected to rise to a level sufficient for the first operating mode for these measurement times. In other words, flow rate parameters determined in the second operating mode are only taken into account if the satisfaction of the switchover condition within a specified number of measurement times after this determination indicates that these flow parameters are based on a real, significant measurement effect and corresponding values were not caused only by measurement noise or faults.

In order to prevent an overestimation of the mean value or volume flow value thus determined, the proportionality factor can be reduced if the operation in the second operating mode only lasted a short time, in particular if flow rate parameters in the second operating mode were determined and temporarily stored for fewer measuring points than the number of previous flow rate parameters taken into account. For example, the proportionality factor can be limited to the number of previous consecutive measurements in the first operating mode plus one.

A similar effect to the reduction of the proportionality factor described above can also be achieved if, instead of a fixed number of the previous flow rate parameters being taken into account, this number is chosen in such a way that it does not exceed either a predetermined limit value or the number of immediately preceding flow rate parameters recorded in the second operating mode. As a result, flow rate parameters determined in the first operating mode, in particular, which have already been used directly to increase the volume quantity, cannot be taken into account again in satisfying the switchover condition in order to avoid double counting of the corresponding volumes.

In some application cases, for example, if the determination of excessive volume quantities is to be avoided in a robust manner, it may be advantageous to use a smaller proportionality factor, for example even a proportionality factor of one, or a constant that is specified by the measuring parameters of the device. In these cases, the use of the preceding flow rate parameters when satisfying the switchover condition is used primarily to achieve a defined behavior of the flow measuring device when entering the first operating mode, and to a lesser extent to take into account volume flow rates during operation in the second operating mode.

When operating in the first operating mode, for measurement times after a measurement time including when a switchover from the second to the first operating mode has occurred due to the satisfaction of the switchover condition, the increase in the volume quantity may be independent of the previous flow rate parameters. In other words, the previously determined flow rate parameters are only used when switching over to the first operating mode, and in the subsequent operation within the first operating mode these flow rate parameters are not taken into account. In particular, no pre-averaging of the current flow rate parameter with the preceding flow rate parameters is carried out, but the increase of the volume quantity follows directly on the basis of the current flow rate parameter.

The data memory can be implemented, in particular, as a ring buffer, so that storing the current flow rate parameter in the data memory overwrites the oldest preceding flow rate parameter located in the data memory. On one hand, this allows a relatively small data memory to be used. On the other hand, if the length of the ring buffer is suitably chosen, particularly efficient data processing can be carried out. For example, if the length of the ring buffer is selected in such a way that it can store one more flow rate parameter than the specified number of the previous flow rate parameters, a fresh value of the current flow rate parameter can be stored in the ring buffer at the respective measurement time and then all flow rate parameters stored in the ring buffer can be taken into account, for example, in order to determine an average value as explained above.

The flow measuring device according to the invention can include as sensors two ultrasonic transducers, which are spaced apart from each other on the measuring volume, wherein the processing device can be configured to activate one of the ultrasonic transducers in each case to excite an ultrasonic wave in the fluid, and to determine a time of flight of the ultrasonic wave between the ultrasonic transducers using the measurement data of the respective other ultrasonic transducer and to determine the current flow rate parameter as a function of the time of flight. For example, the ultrasonic transducers can be directly vibrationally coupled with the fluid and radiate the ultrasonic wave into a measuring tube at an angle, so that it can be reflected by the measuring tube walls in order to reach the other ultrasonic transducer or the fluid can radiate through at an angle to reach the other ultrasonic transducer. Alternatively, it is possible, for example, to use mirrors to divert the irradiated ultrasonic wave and/or to excite the walls of the measuring volume into vibration first, which in turn couple the ultrasonic wave into the fluid. For example, a Lamb wave can be coupled into the side wall.

As already explained above, in flow measuring devices based on time-of-flight measurements, at low flow rates noticeable measurement errors can occur, which can be reduced or even largely compensated by the configuration according to the invention of the flow measuring device.

The current flow rate parameter can describe a volume flow rate or a time of flight of an ultrasonic wave between two ultrasonic transducers used as sensors, or a time of flight difference between these times of flight for different propagation directions of the ultrasonic wave. A volume flow rate can be determined directly as a physical quantity or as a count value proportional thereto, or similar, as a flow rate parameter.

The processing device can be configured in such a way that if a switch-back condition, the satisfaction of which depends on the current flow rate parameter, is satisfied during operation in the first operating mode, the processing device switches into the second operating mode. The switch-back condition can be, in particular, the failure to satisfy the switchover condition. It is also possible that although the switch-back condition substantially corresponds to the failure to satisfy the switchover condition, different limit values are still used for the switch-back condition and the switchover condition. This can be used, for example, to implement a hysteresis-based switching between the operating modes and thereby suppress errors potentially resulting from frequent switching between the operating modes.

Satisfying the switch-back condition can depend in particular on the mean value of the current flow rate parameter and the specified number of previous flow rate parameters, for example, on a comparison of this mean value, or the volume flow determined from this mean value, with the or with another limit value.

Other features which are considered as characteristic for the invention are set forth in the appended claims.

Although the invention is illustrated and described herein as embodied in a flow measuring device for detecting a volume quantity relating to a fluid volume having flowed through a measuring volume since a start of a measurement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
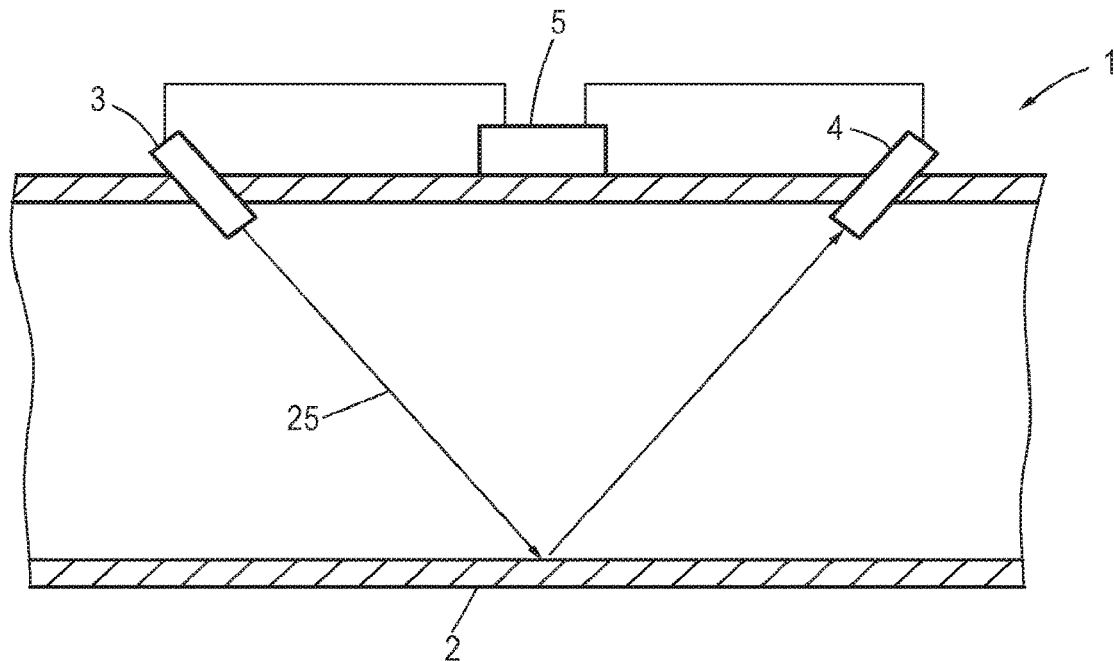
FIG. 1 is a fragmentary, diagrammatic, longitudinal-sectional view of an exemplary embodiment of a flow measuring device according to the invention.

Referring now to the figures of the drawings in detail and first, particularly, to FIG. 1 thereof, there is seen a flow measuring device 1, including two ultrasonic transducers as sensors 3, 4, which are spaced apart from each other on a measuring volume 2, in the example on a measuring tube. Measurement data of the sensors 3, 4 are processed by a processing device 5 in order to determine a volume quantity which relates to a fluid volume that has flowed through the measuring volume 2 of the flow measuring device 1 since the start of the measurement.

In the example shown in FIG. 1, the ultrasonic transducers are in direct contact with the fluid and, as indicated by an arrows 25, permeate through it diagonally with an ultrasonic wave. In alternative embodiments the ultrasonic wave could be coupled, for example, perpendicular to the flow direction and then redirected parallel to the flow direction by ultrasonic mirrors. It would also be possible to place the ultrasonic transducers on the outside wall of the measuring volume 2 and, for example, to couple a guided wave into the side wall, which in turn triggers compression waves in the fluid. A plurality of different approaches for the implementation of ultrasonic flow meters are known in principle. The method described for further processing of the respective measurement data can be used for all of these meter types. In general, it can also be transferred to other flow measuring devices, such as impeller meters or thermal flow rate meters.

Figure 2:
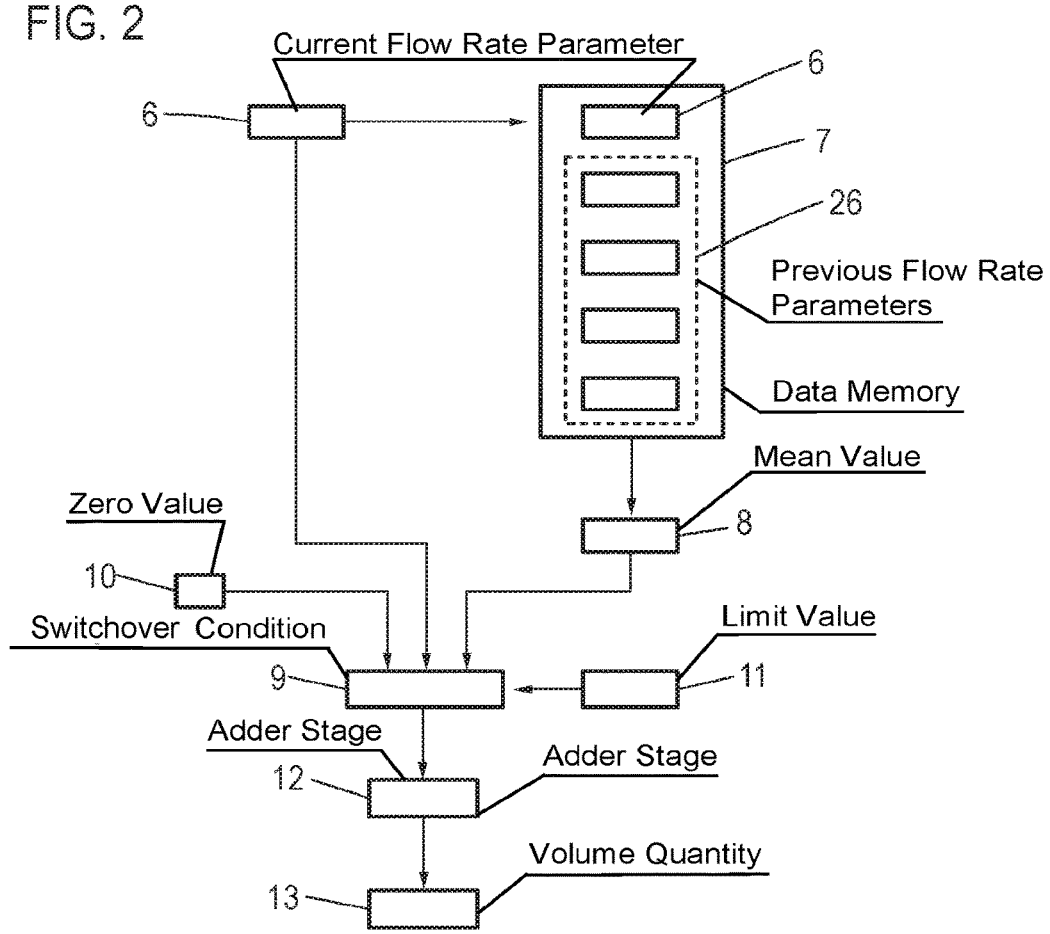
FIG. 2 is a block diagram showing relevant processing modules and data structures implemented by the processing device of the flow measuring device shown in FIG. 1.
Figure 3:
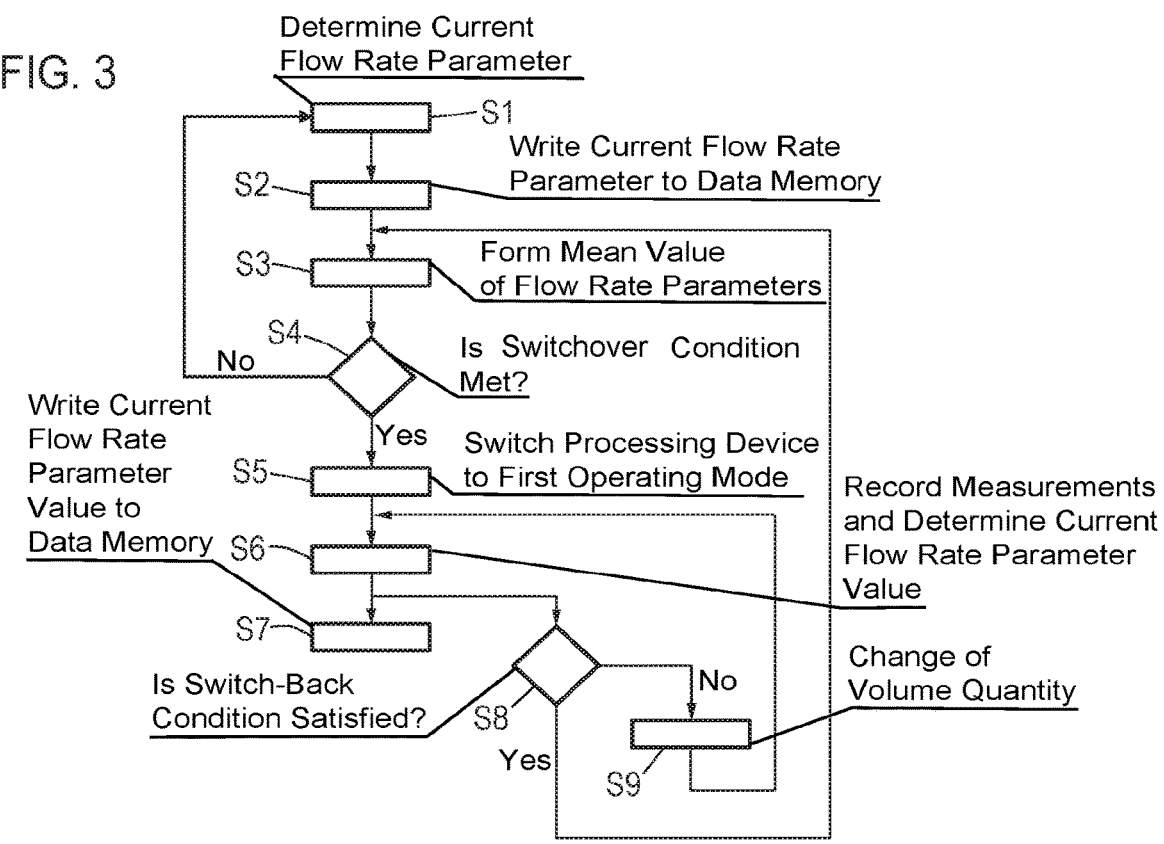
FIG. 3 is a flow diagram showing processing steps carried out by this control device to determine the volume quantity.

The function of the processing device 5 is explained below with additional reference to FIGS. 2 and 3, which show relevant processing modules and data structures or the processing steps carried out. The properties described can be implemented, for example, by programming the processing device accordingly by using a corresponding computer program stored in the flow measuring device. Alternatively, parts of the described functions or even all functions can be implemented by a dedicated circuit. In ultrasonic meters, parts of the data processing are typically implemented by dedicated components, e.g. by comparators, logic gates, etc., and parts of the data processing are carried out by an appropriately programmed processing device, e.g. a microcontroller.

Within the following explanation of the function of the flow measuring device, it is assumed initially that a fluid initially flows in the measuring volume 2 at very low speed or is stationary. In this case, the processing device 5 is initially operated in a second operating mode in which a volume quantity 13 remains unchanged.

When operating in the first operating mode, a current flow rate parameter which relates to a current volume flow rate is first determined at each measurement point in step S1. In the case of the ultrasonic meter shown in FIG. 1, the time of flight of the ultrasonic wave from the sensor 3 to the sensor 4, or the time of flight from the sensor 4 to sensor 3, depends in each case on the velocity of the fluid in the measuring volume 2 and thus on the volume flow rate. Thus, such a time of flight could be used directly as a flow rate parameter 6. As an example, however, it will be assumed that the flow rate parameter 6 directly describes a volume flow rate. For this purpose, the processing device 5 may be configured to determine a time of flight difference between the time of flight of an ultrasonic wave from the sensor 3 to the sensor 4 and of an ultrasonic wave from the sensor 4 to the sensor 3, and from this time of flight difference to calculate a flow velocity of the fluid in the measuring volume 2 and thus, given a known geometry of the measuring volume 2, a volume flow rate.

In step S2 the current flow rate parameter 6 is written to a data memory 7. For example, the data memory 7 can be a ring buffer, so that after a specified number of such write operations the oldest flow rate parameter is overwritten. The result of writing each current flow rate parameter 6 into the data memory 7 is that after a few measurement times in the data memory 7, in addition to the current flow rate parameter 6, there is always a predefined number of previous flow rate parameters 26 which were determined at previous measuring times.

In step S3, a mean value 8 of all flow rate parameters 6, 26 stored in the data memory 7 is formed, i.e. an average of the current flow rate parameter 6 and the predefined number of the previous flow rate parameters 26.

In step S4, it is then checked whether a switchover condition 9 is satisfied. The switchover condition can be met, in particular, if the current flow rate parameter 6 or the mean value 8 is greater than a corresponding limit value 11. In other words, the switchover condition should be met when there appears to be sufficient volume flow to begin or continue a normal measurement operation. If the switchover condition 9 is not met, the processing device 5 remains in the second operating mode. Since the processing device 5 is in the second operating mode, in which the volume quantity is supposed to remain unchanged, if the switchover condition 9 is not satisfied a zero value 10 is selected, which is added to the volume quantity 13 so that this remains unchanged. Such an addition of zero values can be advantageous in some implementation approaches. Alternatively, it would clearly also be possible to completely dispense with such an addition in the second operating mode. The method is then repeated starting from step S1.

If, on the other hand, the switchover condition 9 is satisfied in step S4, the processing device 5 is switched over to the first operating mode in step S5. In this case, the mean value 8, in particular after scaling, is added to the volume quantity 13 once during this switchover by an adder stage 12. A proportionality factor can be used for the scaling, which is equal to the number of flow rate parameters 6, 26 stored in the data memory 7. This means that when switching over, not only the current flow rate parameter but also the previous flow rate parameters 26, typically determined in the second operating mode, are taken into account. However, the fact that the preceding parameters 26 are only taken into account when switching over to the first operating mode ensures that the contribution of these preceding flow rate parameters 26 does not result exclusively from noise, errors or the like, but is based on an actual measurement effect, which also triggers the switchover to the first operating mode.

Alternatively, instead of determining the mean value 8 and the subsequent scaling, it would be also possible to add the flow rate parameters 6, 26 in the data memory 7 directly. As will be explained later with reference to FIG. 4, however, the determination of an average value 8 and the use of a subsequent scaling also enables smaller proportionality factors to be used as required, for example if only a very brief operation was carried out in the second operating mode and an increase of the volume quantity 13 by the sum of all flow rate parameters 6, 26 in the data memory 7 would thus result in double counting of individual flow rate parameters.

After step S5, operation is performed in the first operating mode for the following measuring time. In step S6, as already explained in relation to step S1, measurements are first recorded and the current flow rate parameter value 6 is determined from these. In step S7, this is again written to the data memory 7, as already explained in relation to step S2, and in doing so, in particular, overrides the oldest previous flow rate parameter.

In step S8, it is checked whether a switch-back condition is satisfied. The switch-back condition is satisfied, in particular, if the current flow rate parameter 6 or an average value 8, determined as explained above, is less than a limit value. Satisfaction of the switch-back condition therefore indicates that only very low flow rates are present and therefore the determined flow rate parameters are potentially highly error-prone and therefore should not initially be taken into account. This means that when the switch-back condition is satisfied, a switchover to the second operating mode takes place and the method is repeated from step S3, which means that the volume quantity 13, in particular, initially remains unchanged.

If, on the other hand, the switch-back condition is not satisfied in step S8, since the first operating mode 17 is meanwhile being used as the operating mode, the current flow rate parameter 6 is immediately selected in order to add it to the volume quantity 13 using the adder stage 12. Since the change of the volume quantity 13 in step S9 takes place after the switchover to the first operating mode and thus the single consideration of the predefined number of previous flow rate parameters 26, the change of the volume quantity 13 is independent of the previous flow rate parameters 26.

Figure 4:
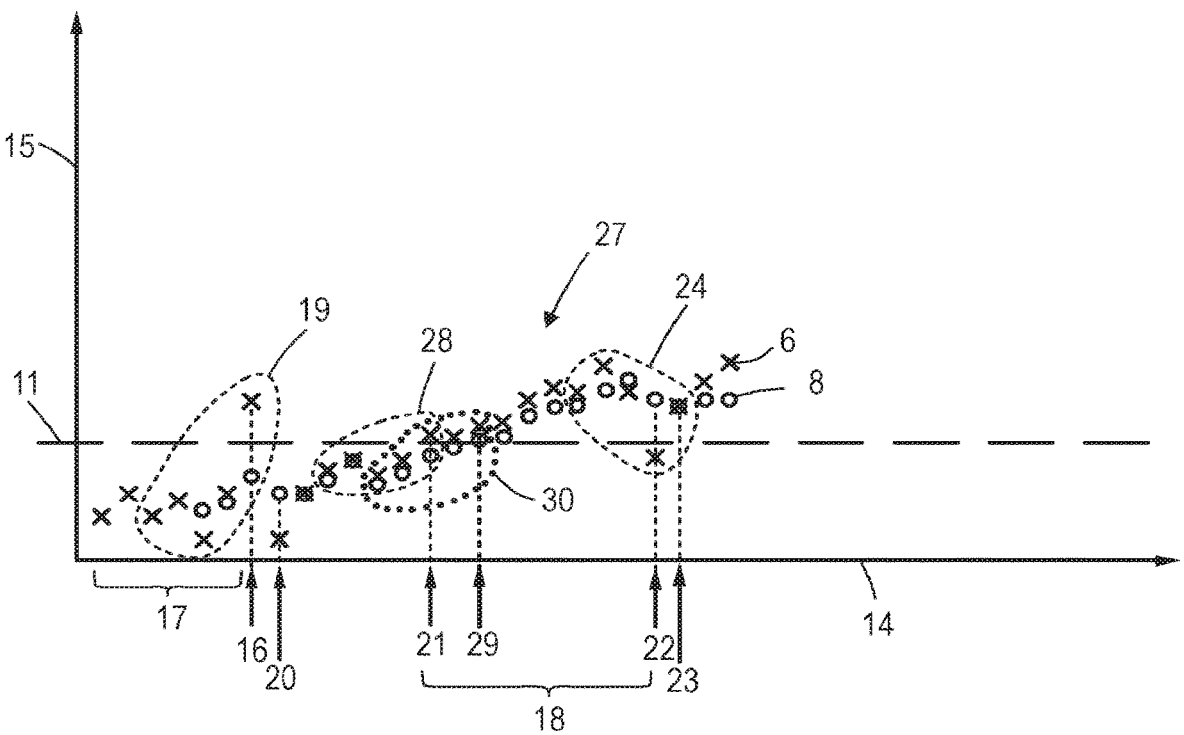
FIG. 4 is a graph showing an example of flow rate parameters.

FIG. 4 shows an example of a time curve 27 of flow rate parameters. The time is plotted on the X-axis 14 and the value of the current flow rate parameter 6 on the Y-axis 15. The current flow rate parameters 6 at the different measurement times are shown as crosses. In addition, for the fifth and all subsequent measurement times, FIG. 4 shows the mean value 8 from the current flow rate parameter 6 at this time and the four preceding flow rate parameters 26 as a circle. The four flow rate parameters 26 previously taken into account correspond in this case to the current flow rate parameters 6 at the four immediately preceding measurement times.

In addition, FIG. 4 shows the limit value 11, which when exceeded by the respective current flow rate measurement 6 or the mean value 8, should cause operation in, or a switchover into, the first operating mode 18. If the limit value is not reached, on the other hand, operation in or switchover into the second operating mode 17 should occur. First of all, a measurement operation is explained which results from a direct comparison of the current flow rate parameter 6 with the limit value 11. As will be explained below, instead the mean value 8 can be advantageously compared with the limit value.

In the time curve 27 of the flow rate parameter 6 shown, the device is initially operated in the second operating mode 17. Not until the measurement time 16 does the current flow rate parameter 6 exceed the limit value 11, so that the switchover condition is satisfied. The flow rate parameters 19 which are located in the data memory 7 at this time are marked in FIG. 4. Since the previous flow rate parameters 26 have relatively low values at the measurement time 16, consideration of the previous flow rate parameters 26, for example in the case in which the sum of all of the flow rate parameters contained in the data memory 7 is added to the volume quantity 13, has little effect on this. Previous flow rate parameters 26, which are primarily caused by noise or errors, therefore only have a minor effect on the volume quantity 13.

At the measurement time 20, a very low current flow rate parameter 6 is detected, which initially causes a changeover back to the first operating mode 17. Subsequently, the current flow rate parameters 6 substantially increase continuously, which indicates, for example, a slow opening of a valve or similar. However, the limit value 11 is not exceeded until the measurement time 21. The flow rate parameters 28 which are present in the data memory 7 at this time 21 are again marked. In this case, the previous flow rate parameters 26 are relatively close to the limit value 11, so that by taking these previous flow rate parameters into account, the volume quantity 13 can be significantly increased and thus flow rates that exist within the second operating mode can also be taken into account to a relatively large extent when determining the volume quantity 13.

At the end of the time curve 27, the current flow rate parameter 6 briefly falls below the limit value 11 at a measurement time 22, and then rises above the limit value 11 again at a measurement time 23. This allows a rapid changeover between the operating modes 17, 18. The flow rate parameters 24 located in the data memory 7 at the measurement time 23 are highlighted again in FIG. 3. In the case shown, an increase in the volume quantity by the sum of all flow rate parameters 24 contained in the data memory 7 would result in three of the previous flow rate parameters 26 already being taken into account at the time of their determination, since they are determined during operation in the first operating mode 18, and again at the measurement time 23. This would lead to an artificial increase in the volume quantity 13 in some operating situations.

In order to avoid this, as explained above, for the flow rate parameters 6, 26 or 24 in the data memory 7 the mean value 8 is calculated and then scaled by a proportionality factor. In the example, there are five flow rate parameters 6, 26 stored in the data memory 7. Thus, a proportionality factor of five during scaling corresponds to a summation. However, at the measurement time 23, it can be recognized that only one of the preceding flow rate parameters 26 was recorded in the second operating mode 17, so that instead of a scaling factor of five, a scaling factor of two can be used, for example. Alternatively, in such cases it would be possible to reduce the predefined number of previously considered flow rate parameters 26 accordingly.

In the procedure described above, individual, particularly high or particularly low current flow rate parameters 6, as shown in FIG. 4 for the measurement times 16 and 22, can lead to a change in the operating mode being used, although corresponding jumps in the flow rate parameter are often caused by errors in the measurement and not by actual flow rate changes. Although the effects of such errors are reduced by the above procedure, the measurement accuracy can be further improved if instead of the respective current flow rate parameter 6 the mean value 8 of the current flow rate parameter 6 and a specified number, in the example four, of the preceding flow rate parameters 26 are taken into account, i.e. in particular compared with the limit value 11, as part of the switchover condition or the switch-back condition.

In the example shown, the mean value 8 of the flow rate parameters 19 at the measurement time 16 is below the limit value 11, so that the problematic short-term switchover to the first operating mode 18 is suppressed. Likewise, the mean value 8 at the measurement time 22 is above the limit value 11, so that the problematic short-term switchover to the second operating mode 17 is suppressed.

A switchover to the first operating mode 18 when switching on the basis of the mean value 8 does not occur in the example shown until measurement time 29, at which the mean value 8 of the flow rate parameters 30 exceeds the limit value 11, and thus only when a temporally extended increase, or a very high value, of the current flow rate parameter indicates an actual flow rate increase. Compared to the above-described switchover on the basis of the current flow rate measurement 6 without a preceding averaging calculation, the switchover to the first operating mode takes place somewhat later, which can lead to a slight underestimation of the volume quantity. However, this is typically compensated for by the increase in the volume quantity on the basis of the mean value 8 during the switchover, since this also allows for flow rate parameters recorded prior to the switchover to be taken into account.

LIST OF REFERENCE SIGNS 1 flow measuring device
2 measuring volume
   3 sensor
   4 sensor
   5 processing device
   6 flow rate parameter
   7 data memory
   8 mean value
   9 switchover condition
   10 zero value
   11 limit value
   12 adder stage
   13 volume quantity
   14 x-axis
   15 y-axis
   16 measurement time
   17 operating mode
   18 operating mode
   19 flow rate parameters
   20 measurement time
   21 measurement time
   22 measurement time
   23 measurement time
   24 flow rate parameters
   25 arrow
   26 flow rate parameters
   27 curve
   28 flow rate parameters
   29 measurement time
   30 flow rate parameters

The invention claimed is:

1. A flow measuring device for detecting a volume quantity relating to a fluid volume flowing through a measuring volume of the flow measuring device since a start of a measurement, the flow measuring device comprising:
at least one sensor; and
a processing device including a data memory;
said processing device configured to determine a current flow rate parameter relating to a current volume flow rate at successive measurement times, each using measurement data of said at least one sensor to detect the volume quantity by increasing the volume quantity as a function of said current flow rate parameter upon operating said processing device in a first operating mode and to keep the volume quantity constant upon operating said processing device in a second operating mode;
said processing device configured, in said second operating mode or in both said first and second operating modes, to store said respective current flow rate parameter for each measurement time at least temporarily in said data memory, resulting, after a plurality of measuring times, in a plurality of previous flow rate parameters determined at the measuring times being stored in said data memory; and
said processing unit, upon a satisfaction of a switchover condition during operation in said second operating mode, switching over said processing unit to said first operating mode for increasing the volume quantity as a function of both said current flow rate parameter and a predefined number of said previous flow rate parameters, wherein the satisfaction of the switchover condition depends on said current flow rate parameter.

2. The flow measuring device according to claim 1, wherein said processing device is configured to permit said switchover condition to be satisfied or to only be satisfied on condition that at least one of said current flow rate parameter or a mean value of said current flow rate parameter and said predefined number of said previous flow rate parameters or a volume flow rate determined from said current flow rate parameter or said mean value, exceeds a respective limit value.

3. The flow measuring device according to claim 2, wherein said processing device is configured to specify said limit value as a function of measurement data of at least one of said at least one sensor or at least one additional sensor recorded at least one of:
at a current measurement time, or
at said previous measurement times.

4. The flow measuring device according to claim 1, wherein said processing device is configured to make said increase in the volume quantity, upon satisfying said switchover condition, proportional to a mean value of said current flow rate parameter and said predefined number of previous flow rate parameters or to a volume flow rate value determined from said mean value.

5. The flow measuring device according to claim 1, wherein during operation in said first operating mode, for measurement times after a measurement time at which a switchover occurred from said second into said first operating mode due to a satisfaction of said switchover condition, said processing device is configured to make said increase in the volume quantity independent of said previous flow rate parameters.

6. The flow measuring device according to claim 1, wherein said data memory is a ring buffer causing said storing of said current flow rate parameter in said data memory to overwrite an oldest preceding flow rate parameter located in said data memory.

7. The flow measuring device according to claim 1, wherein said at least one sensor includes two ultrasonic transducers being mutually spaced apart on the measuring volume, and said processing device is configured to activate a respective one of said ultrasonic transducers to excite an ultrasonic wave in the fluid and to determine a time of flight of said ultrasonic wave between said ultrasonic transducers using measurement data of another of said ultrasonic transducers and to determine said current flow rate parameter as a function of said time of flight.

8. The flow measuring device according to claim 1, wherein said at least one sensor includes two ultrasonic transducers, and said current flow rate parameter describes a volume flow rate or a time of flight of an ultrasonic wave between said two ultrasonic transducers or a time of flight difference between times of flight for different propagation directions of said ultrasonic wave.

9. The flow measuring device according to claim 1, wherein said processing device is configured to switch into said second operating mode upon a satisfaction of a switch-back condition during operation in said first operating mode, wherein the satisfaction of the switch-back condition depends on said current flow rate parameter.

\* \* \* \* \*